US012596040B2

(12) United States Patent
Yoshimoto et al.

(10) Patent No.: US 12,596,040 B2
(45) Date of Patent: Apr. 7, 2026

(54) PRESSURE SENSOR AND WEARABLE SENSOR

(71) Applicant: Hitachi, Ltd., Tokyo (JP)

(72) Inventors: Hiroyuki Yoshimoto, Tokyo (JP); Yu Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 27 days.

(21) Appl. No.: 18/376,123

(22) Filed: Oct. 3, 2023

(65) Prior Publication Data

US 2024/0118156 A1 Apr. 11, 2024

(30) Foreign Application Priority Data

Oct. 6, 2022 (JP) ................................. 2022-161771

(51) Int. Cl.
*G01L 5/22* (2006.01)
*A41D 19/00* (2006.01)
(Continued)

(52) U.S. Cl.
CPC .......... *G01L 5/226* (2013.01); *A41D 19/0027* (2013.01); *G01L 1/18* (2013.01); *G01L 1/20* (2013.01); *G01L 5/101* (2013.01)

(58) Field of Classification Search
CPC . G01L 5/101; G01L 5/226; G01L 1/20; G01L 1/18; A41D 19/0027
(Continued)

(56) References Cited

U.S. PATENT DOCUMENTS

| | | | | |
|---|---|---|---|---|
| 4,634,917 A | * | 1/1987 | Dvorsky | H10N 30/302 |
| | | | | 310/366 |
| 6,388,556 B1 | * | 5/2002 | Imai | H01C 10/106 |
| | | | | 338/114 |

(Continued)

FOREIGN PATENT DOCUMENTS

| | | | | |
|---|---|---|---|---|
| CN | 101387933 A | * | 3/2009 | G06F 3/0436 |
| CN | 110612437 A | * | 12/2019 | G01L 1/146 |

(Continued)

OTHER PUBLICATIONS

Translation KR_20180117889 (Year: 2018).*
Translation CN_110612437 (Year: 2019).*
Translation DE102018128082. (Year: 2020).*

*Primary Examiner* — Peter J Macchiarolo
*Assistant Examiner* — Monica S Young
(74) *Attorney, Agent, or Firm* — MATTINGLY & MALUR, PC

(57) ABSTRACT

A technique that can emit a sensor signal that accurately reflects only the pressure to be truly detected in a glove-type wearable sensor in which a film-like pressure sensor is incorporated into a fingertip of a thin work glove is disclosed. In a film-like pressure sensor incorporated into a fingertip of a glove-type wearable sensor, three coordinate axis directions in a three-dimensional orthogonal coordinate system are assumed to be a vertical direction, a longitudinal direction of the pressure sensor, and a width direction of the pressure sensor, at least one or more flexible printed circuits and one sheet-like pressure sensitive element are laminated in the vertical direction, and only the pressure applied to the fingertip of a wearer after wearing the wearable sensor is detected.

11 Claims, 9 Drawing Sheets

(51) Int. Cl.

| | | |
|---|---|---|
| *G01L 1/18* | (2006.01) | |
| *G01L 1/20* | (2006.01) | |
| *G01L 5/101* | (2020.01) | |

(58) Field of Classification Search

USPC ........................................ 702/98; 73/862.381

See application file for complete search history.

(56) References Cited

U.S. PATENT DOCUMENTS

| | | | | |
|---|---|---|---|---|
| 7,019,734 | B2 * | 3/2006 | Cross ...................... | G06F 3/045 |
| | | | | 178/18.05 |
| 8,966,997 | B2 * | 3/2015 | Taylor ....................... | G01L 5/00 |
| | | | | 73/862.041 |
| 11,209,418 | B2 * | 12/2021 | Haick ................. | G01L 19/0092 |
| 2012/0116251 | A1 * | 5/2012 | Ben-Shalom .......... | A61B 5/447 |
| | | | | 600/587 |
| 2016/0247999 | A1 * | 8/2016 | Aliane ................. | H10N 30/302 |
| 2019/0339143 | A1 * | 11/2019 | Järvinen ................. | G01L 1/146 |
| 2021/0022234 | A1 * | 1/2021 | Polak ........................ | A61L 2/14 |
| 2021/0232253 | A1 * | 7/2021 | Cheng .................... | H10K 59/40 |
| 2022/0207978 | A1 * | 6/2022 | Ishimaru .............. | A41D 19/015 |

FOREIGN PATENT DOCUMENTS

| | | | | | |
|---|---|---|---|---|---|
| CN | 114063788 | A | * | 2/2022 | |
| DE | 102018128082 | A1 | * | 5/2020 | |
| JP | 2005-349493 | A | | 12/2005 | |
| JP | 2021-001410 | A | | 1/2021 | |
| KR | 20180117889 | A | * | 10/2018 | |
| KR | 20200053446 | A | * | 5/2020 | |
| WO | WO-2016070078 | A1 | * | 5/2016 | ........... A61B 5/6843 |

* cited by examiner

11

1 (1a, 1b, 1c)

(PROTECT WITH ADHESIVE FILM WHOSE SIDE SURFACES
ARE DIVIDED INTO PLURALITY OF PIECES)

THESE
PARTS ARE
BENT

31

(SURFACE WHERE
TENSILE STRESS ACTS)
51

32a

33

32b 52
(SURFACE WHERE
COMPRESSIVE
STRESS ACTS)

(UPPER
SUBSTRATE)

(LOWER
SUBSTRATE)

(UPPER
SUBSTRATE)

(LOWER
SUBSTRATE)

PRESSURE SENSOR AND WEARABLE SENSOR

CROSS-REFERENCE TO RELATED APPLICATION

The present application claims priority from Japanese application JP2022-161771, filed on Oct. 6, 2022, the content of which is hereby incorporated by reference into this application.

BACKGROUND OF THE INVENTION

1. Field of the Invention

The present invention relates to a pressure sensor and a glove-type wearable sensor in which the pressure sensor is incorporated into a fingertip.

2. Description of the Related Art

In a manufacturing site of today where the automation of production lines has been advanced, there are still quite a few work processes that require human labor. In the work processes that require human labor, there are problems such as the retirement of skilled workers and the resulting shortage of successors, in addition to chronic labor shortages caused by a decline in the working-age population. As part of efforts to solve such problems, in recent years, the action of skilled workers during work has been digitized to be used as teaching materials in vocational training for the development of successors or used as a standard to check whether or not the work is accurate.

One of the main methods for digitizing the action of people who are working is a method in which various wearable sensors are mounted on a worker to directly sense the action of the worker.

As an example, when digitizing various manual works including an action of grasping and releasing an object, a method of using a glove-type wearable sensor in which a film-like or sheet-like pressure sensor is incorporated into a fingertip of a work glove has been known as an effective method (for example, JP-2021-001410-A).

SUMMARY OF THE INVENTION

In an actual manufacturing site, it is very important that the glove-type wearable sensor worn by a worker have a good wearing feeling fitting well to the tip of a hand and not hindering the action, so as not to interfere with the work. Therefore, it is preferable for the glove-type wearable sensor provided for the above-described applications to have a film-like or sheet-like (hereinafter, simply and correctively referred to as "film-like") pressure sensor incorporated into a fingertip of a thin work glove.

However, in a case where such wearable sensors are created using thin work gloves in order to obtain a good wearing feeling, there is a problem that, at the time of wearing of the wearable sensor or when the finger is bent after wearing, various stresses act on a pressure sensitive element inside a pressure sensor to thereby cause the pressure sensor to react and unnecessary sensor values are acquired.

In view of the above problem, an object of the present invention is to provide a technique that can emit a sensor signal that accurately reflects only the pressure to be truly detected in a glove-type wearable sensor in which a film-like pressure sensor is incorporated into a fingertip of a thin work glove.

A pressure sensor according to the present invention is a film-like pressure sensor incorporated into a fingertip of a glove-type wearable sensor, three coordinate axis directions in a three-dimensional orthogonal coordinate system are assumed to be a vertical direction, a longitudinal direction of the pressure sensor, and a width direction of the pressure sensor, at least one or more flexible printed circuits and one sheet-like pressure sensitive element are laminated in the vertical direction, and only a pressure applied to a fingertip of a wearer after wearing the wearable sensor is detected.

In addition, a glove-type wearable sensor in which the above pressure sensor is incorporated into a fingertip is also within the scope of the present invention.

The other problems and solving methods disclosed in this application will be clarified by the description in the column of the description of the preferred embodiments and the drawings.

According to the present invention, in a glove-type wearable sensor in which a film-like pressure sensor is incorporated into a fingertip of a thin work glove, only the pressure applied to the fingertip of a wearer after wearing the wearable sensor can accurately be detected. As a result, it is possible to emit a sensor signal that accurately reflects only the pressure to be truly detected.

DESCRIPTION OF THE PREFERRED EMBODIMENTS

Hereinafter, some embodiments will be described.

It should be noted that the following description assumes that three coordinate axis directions in a three-dimensional orthogonal coordinate system are a vertical direction, a longitudinal direction of a pressure sensor, and a width direction of the pressure sensor.

First Embodiment

Figure 1:
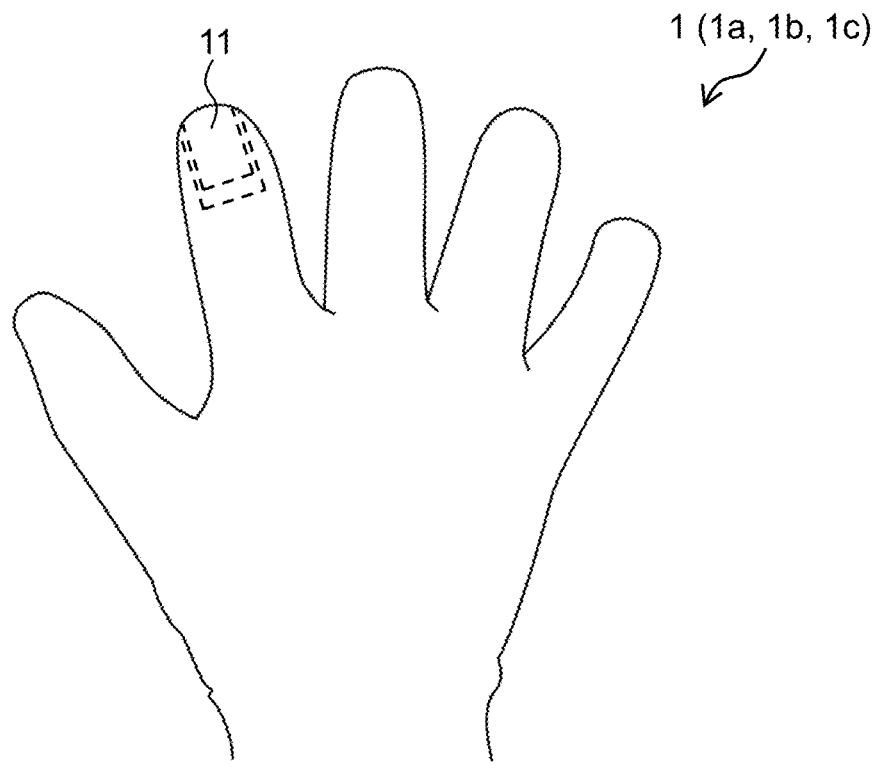
FIG. 1 shows the appearance of a wearable sensor.

First, the outline of a wearable sensor will be described. FIG. 1 shows the appearance of a wearable sensor 1.

As shown in FIG. 1, the wearable sensor 1 is a glove-type wearable sensor that is also referred to as a sensor glove or a sensor-incorporated glove and in which a film-like pressure sensor 11 is incorporated into a fingertip of a thin work glove. The pressure sensor 11 is incorporated into the center region on the cushion side of the fingertip of the wearable sensor 1, and when the wearable sensor 1 is mounted on a hand of a wearer, the shape thereof is deformed along the shape of the fingertip of the wearer. Accordingly, the wearable sensor 1 fits well to the tip of the hand of the wearer. As a result, the wearer of the wearable sensor 1 can obtain a good wearing feeling that does not hinder work even in an actual manufacturing site.

In addition, since the pressure sensor 11 incorporated into the fingertip is provided with features to be described later, the wearable sensor 1 can relieve various stresses acting on a pressure sensitive element of the pressure sensor 11 incorporated into the fingertip, at the time of wearing of the wearable sensor 1 or when the finger is bent after wearing. As a result, the wearable sensor 1 can properly detect only the pressure applied to the fingertip of the wearer after wearing (described later in detail).

That is, the wearable sensor 1 provided with the above features fits well to the tip of the hand of the wearer and can accurately detect only the application of pressure to the fingertip of the wearer after wearing.

It should be noted that, although the wearable sensor 1 exemplified in FIG. 1 is illustrated on the assumption that the pressure sensor 11 is incorporated into the fingertip of the index finger, to facilitate understanding, it is obvious that the pressure sensor 11 may be incorporated into the fingertip of another finger or into the fingertips of a plurality of fingers. In addition, it is sufficient if the specific position and orientation of the pressure sensor 11 incorporated into the fingertip of the wearable sensor 1 are appropriately determined according to the details of the action of the wearer during the work and the physical features of the wearer.

Next, a pressure sensor incorporated into the wearable sensor 1 will be described.

Figure 2:
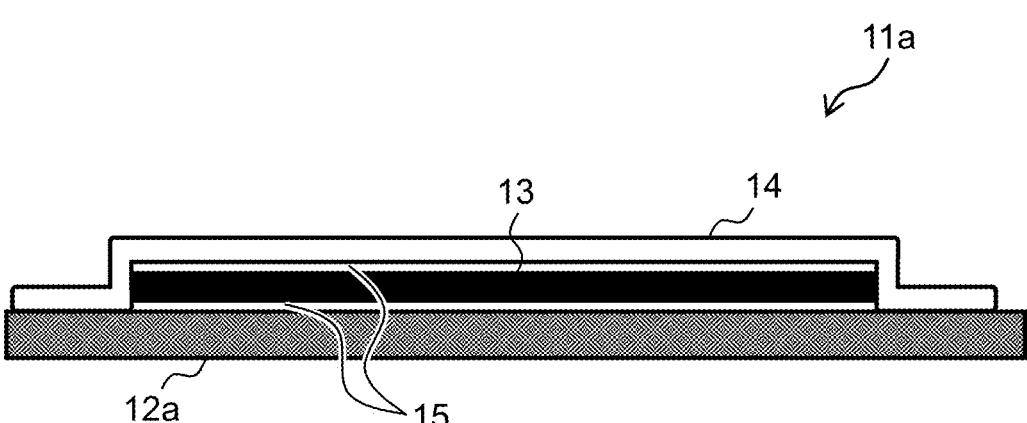
FIG. 2 shows a configuration of a pressure sensor according to a first embodiment.

FIG. 2 shows a configuration of a pressure sensor 11a according to the first embodiment.

The pressure sensor 11a shown in FIG. 2 includes one flexible printed circuit 12a, one pressure sensitive element 13, and one protective film 14. In the flexible printed circuit 12a, a sheet-like electrode made of a conductive metal foil such as a copper foil is provided inside a polymer thick film (PTF). The electrode provided in the flexible printed circuit 12a is formed approximately in a comb-like shape when viewed from the vertical direction. On the upper surface side of the flexible printed circuit 12a, the sheet-like pressure sensitive element 13 is provided approximately parallel to the flexible printed circuit 12a. The pressure sensitive element 13 is electrically connected to the electrode of the flexible printed circuit 12a. Then, on the upper surface side of the pressure sensitive element 13, the protective film 14 made of insulating resin is arranged, and an upper surface of the flexible printed circuit 12a and a lower surface of the protective film 14 are bonded and fixed to each other at the periphery of the pressure sensor 11a.

That is, the pressure sensitive element 13 is enclosed in an inner space of the pressure sensor 11a, the inner space being formed by the upper surface of the flexible printed circuit 12a and the lower surface of the protective film 14, in a position where a lower surface of the pressure sensitive element 13 faces the upper surface of the flexible printed circuit 12a and an upper surface of the pressure sensitive element 13 faces the lower surface of the protective film 14. Then, double-sided non-adhesive films 15 are interposed between the lower surface of the pressure sensitive element 13 and the upper surface of the flexible printed circuit 12a and between the upper surface of the pressure sensitive element 13 and the lower surface of the protective film 14.

When various pressures are applied to the fingertip of the wearable sensor 1 (1a) into which the pressure sensor 11a is incorporated, the pressure sensor 11a is deformed, and the pressure sensitive element 13 inside the pressure sensor 11a is accordingly deformed as well. Inside the pressure sensitive element 13, fine particles having conductivity uniformly exist at approximately equal intervals in a state where the wearable sensor 1 (1a) is not worn, that is, in an initial state. However, when the pressure sensitive element 13 is deformed, the distance between the fine particles existing inside is partially expanded and contracted. Therefore, an electrical resistance value in the pressure sensitive element 13 changes when being energized. Accordingly, the wearable sensor 1 (1a) can detect various pressures applied to the fingertip.

It should be noted that, unlike the pressure sensor 11a, the pressure sensor in the prior art does not have the double-sided non-adhesive films 15 interposed between a lower surface of the pressure sensitive element and an upper surface of the flexible printed circuit and between an upper surface of the pressure sensitive element and a lower surface of the protective film, but the lower surface of the pressure sensitive element and the upper surface of the flexible printed circuit are bonded and fixed to each other, and the upper surface of the pressure sensitive element and the lower surface of the protective film are bonded and fixed to each other. Therefore, when the pressure sensor is deformed, not only (1) the stress acting on the pressure sensitive element itself when deformed, but also (2) the stress applied from the protective film and (3) the stress applied from the flexible printed circuit act on the pressure sensitive element due to the difference in physical and mechanical properties of the flexible printed circuit, the pressure sensitive element, and the protective film. Therefore, the pressure detected by the pressure sensor in the prior art is any one of (1) to (3) of the above or a combination of (1) to (3) of the above. Due to the presence of such problems, the pressure sensor in the prior art cannot emit a sensor signal that accurately reflects only the pressure to be truly detected.

However, in the pressure sensor 11a, the double-sided non-adhesive films 15 are interposed between the lower surface of the pressure sensitive element 13 and the upper surface of the flexible printed circuit 12a and between the upper surface of the pressure sensitive element 13 and the lower surface of the protective film 14 as described above. Therefore, the pressure sensitive element 13 is arranged inside the pressure sensor 11a in a state where the lower surface of the pressure sensitive element 13 is not bonded and fixed to the upper surface of the flexible printed circuit 12a and the upper surface of the pressure sensitive element 13 is not bonded and fixed to the lower surface of the protective film 14. Accordingly, unnecessary stress acting on the pressure sensitive element in relation to the flexible printed circuit and the protective film in the prior art is not applied to the pressure sensitive element 13, and thus the pressure sensor 11a can emit a sensor signal that accurately reflects only the pressure to be truly detected.

Figure 3A:
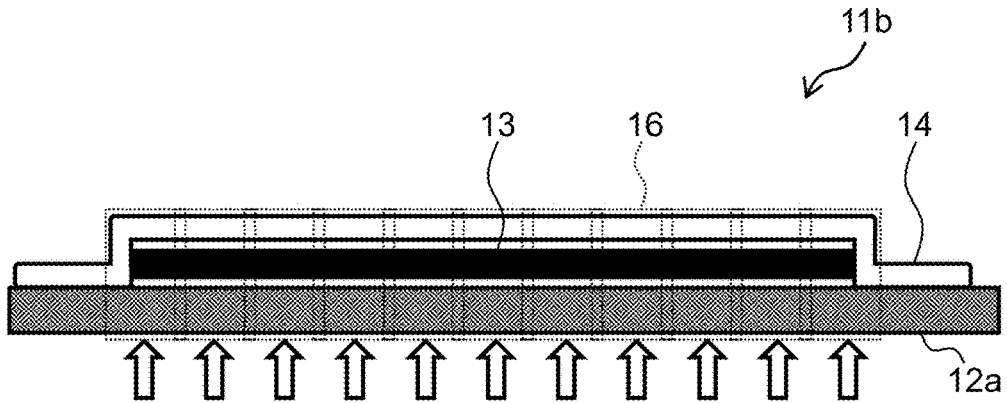
FIG. 3A shows a modified example of the configuration of the pressure sensor according to the first embodiment.
Figure 3B:
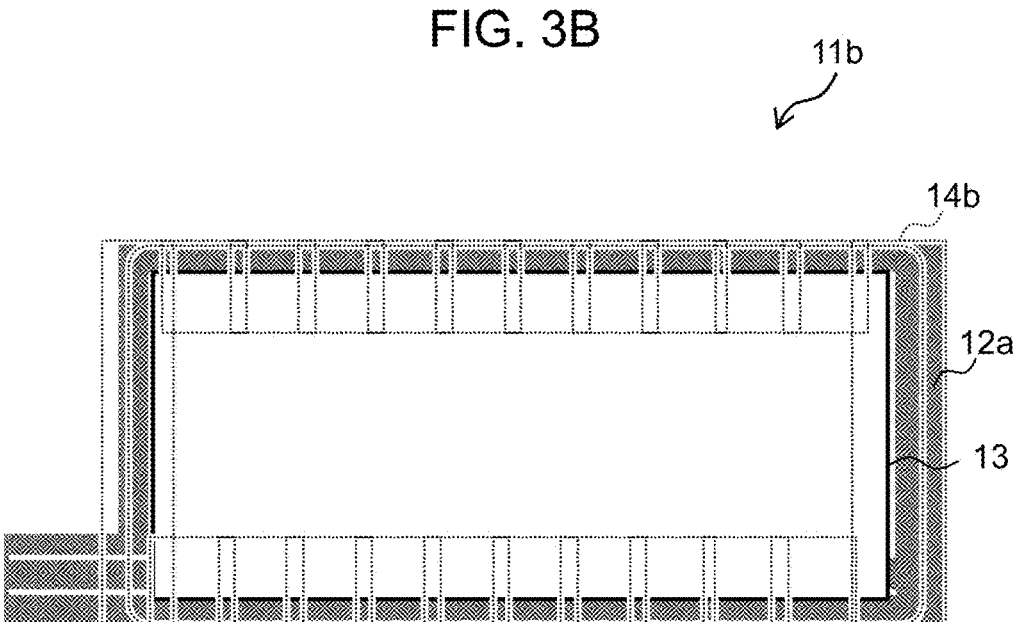
FIG. 3B shows a modified example of the configuration of the pressure sensor according to the first embodiment.

It should be noted that the pressure sensor may be protected by an adhesive film whose side surfaces in the longitudinal direction are divided into a plurality of pieces as shown in FIGS. 3A and 3B. In this case, side surfaces of a pressure sensor 11b may be separately protected by a plurality of divided adhesive films 16 as shown in FIG. 3A, or side surfaces of a protective film 14b that protects the side surfaces of the pressure sensor 11b may be divided into a plurality of pieces as shown in FIG. 3B. In such a case, the stress on the side surfaces of the pressure sensor 11b can be relieved because side surfaces of the adhesive film 16 or the protective film 14b that protects the side surfaces of the pressure sensor 11b are divided into a plurality of pieces.

Second Embodiment

A wearable sensor 1b of the second embodiment is equivalent to the wearable sensor 1 (1a) shown in FIG. 1 in the description of the first embodiment, except that the structure of the pressure sensor incorporated into the fingertip is different.

Figure 4A:
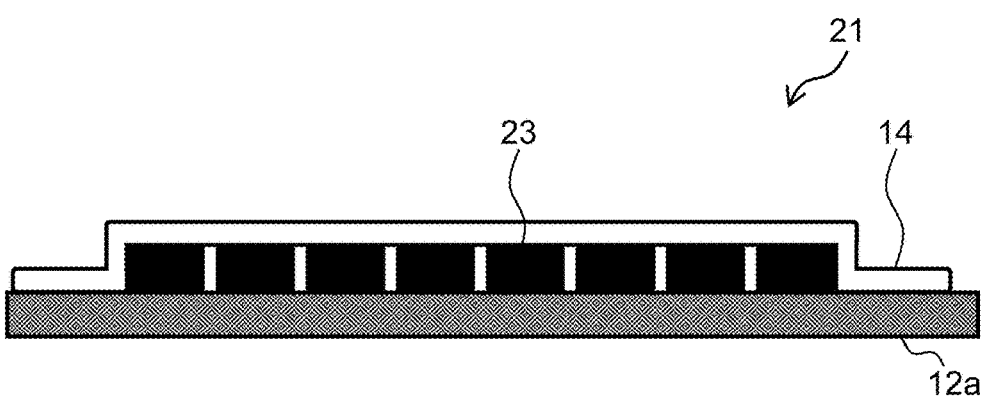
FIG. 4A shows a configuration of a pressure sensor according to a second embodiment.
Figure 4B:
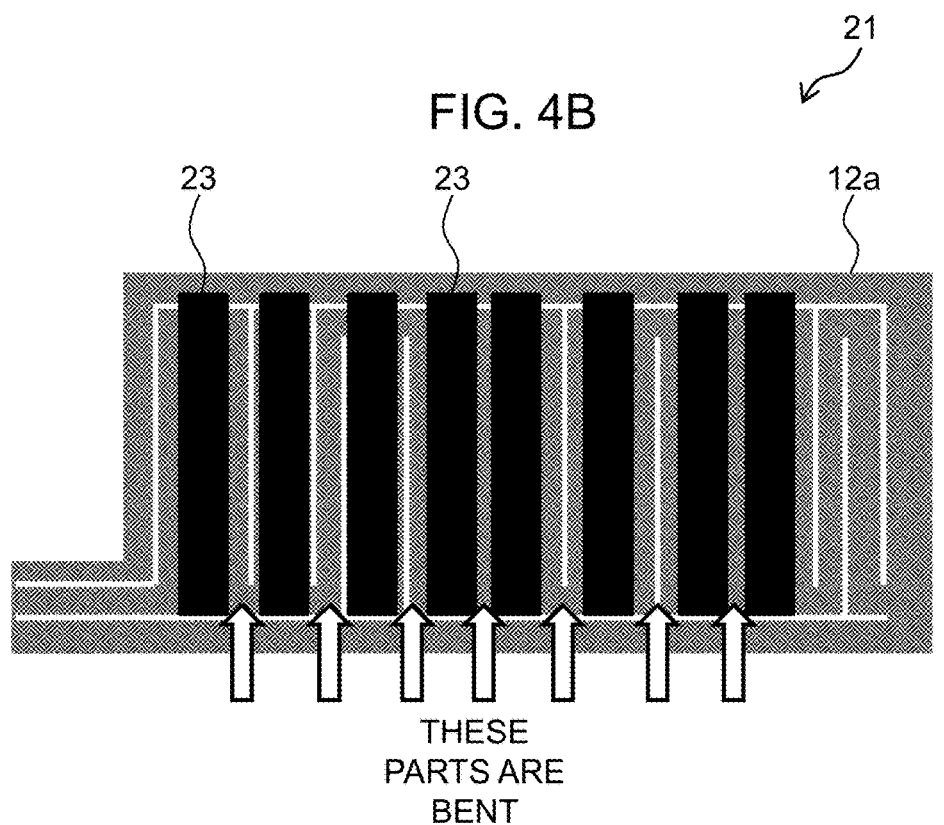
FIG. 4B shows the configuration of the pressure sensor according to the second embodiment.

FIGS. 4A and 4B show a configuration of a pressure sensor 21 according to the second embodiment. FIG. 4A is a longitudinal cross-sectional view, and FIG. 4B is a top view.

The pressure sensor 21 shown in FIGS. 4A and 4B includes one flexible printed circuit 12a, a plurality of sheet-like pressure sensitive elements 23 divided into strips in which a width direction of the pressure sensor 21 is a longitudinal direction of each of the pressure sensitive elements 23, and one protective film 14. The pressure sensitive element 23 is enclosed in an inner space of the pressure sensor 21, the inner space being formed by the upper surface of the flexible printed circuit 12a and the lower surface of the protective film 14, in a position where a lower surface of the pressure sensitive element 23 faces the upper surface of the flexible printed circuit 12a and an upper surface of the pressure sensitive element 23 faces the lower surface of the protective film 14. The pressure sensitive elements 23 are arranged such that the pressure sensitive elements 23 adjacent to each other are approximately parallel to each other, and certain intervals are provided between the pressure sensitive elements 23. That is, the plurality of strip-like pressure sensitive elements 23 are arranged approximately at equal intervals such that a width direction of each of the pressure sensitive elements 23 is a longitudinal direction of the pressure sensor 21. Accordingly, the pressure sensor 21 bends at the positions of the intervals provided between the pressure sensitive elements 23, so that the stress acting on each pressure sensitive element 23 is only caused by the pressure to be truly detected. As a result, the pressure sensor 21 can emit a sensor signal that accurately reflects only the pressure to be truly detected.

Figure 5:
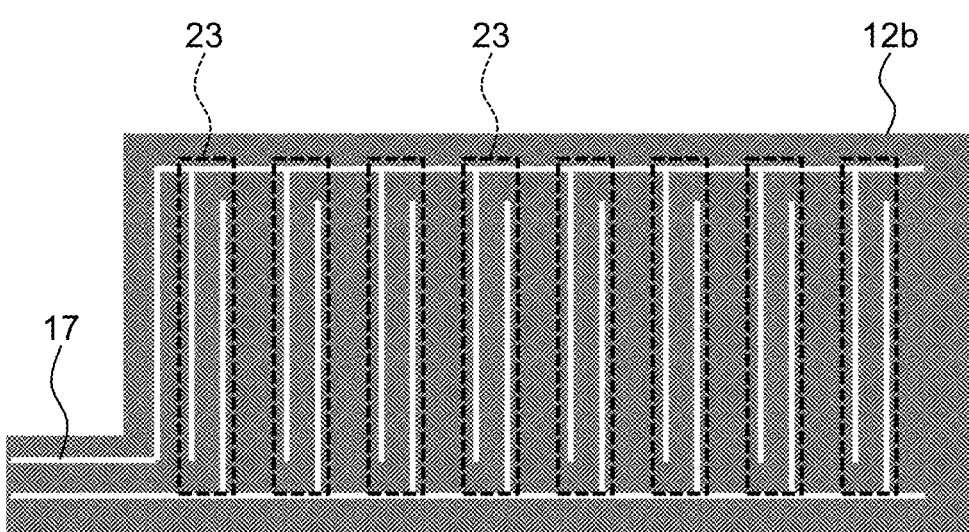
FIG. 5 shows a modified example of a configuration of a flexible printed circuit of the pressure sensor according to the second embodiment.

It should be noted that the electrode of the flexible printed circuit used for the above pressure sensor 21 may have a wiring pattern formed such that the position where each pressure sensitive element 23 is arranged and the position of a wire rod overlap each other as in a flexible printed circuit 12b shown in FIG. 5. In such a case, the pressure sensor 21 can more accurately detect the stress acting on each pressure sensitive element 23. In addition, in such a case, since the wire rod of the flexible printed circuit 12b is not arranged at the position of each interval provided between the pressure sensitive elements 23, the pressure sensor 21 becomes more easily bent at the position of each interval. Further, in such a case, when the pressure sensor 21 is manufactured, it is sufficient if each pressure sensitive element 23 is arranged according to the wiring pattern of the flexible printed circuit 12b, and thus each pressure sensitive element 23 can easily be arranged.

Figure 6:
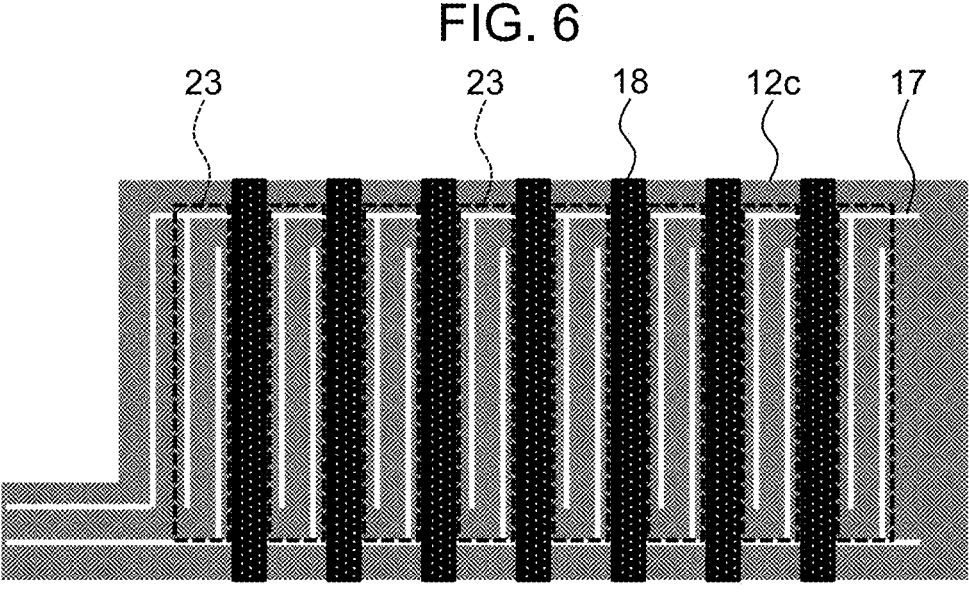
FIG. 6 shows a modified example of a configuration of a flexible printed circuit of the pressure sensor according to the second embodiment.

In addition, the flexible printed circuit used for the above pressure sensor 21 may be formed to be easily bent in such a manner that the position overlapping each interval is formed thinner than the other positions or is formed of a material that is different from the other positions and is more bendable, as in a flexible printed circuit 12c shown in FIG. 6. In such a case, in the pressure sensor 21, the position of each interval provided between the pressure sensitive elements 23 can be more easily bent.

Third Embodiment

A wearable sensor 1c in the third embodiment is equivalent to the wearable sensor 1 (1a) shown in FIG. 1 in the description of the first embodiment, except that the structure of the pressure sensor incorporated into the fingertip is different.

Figure 7:
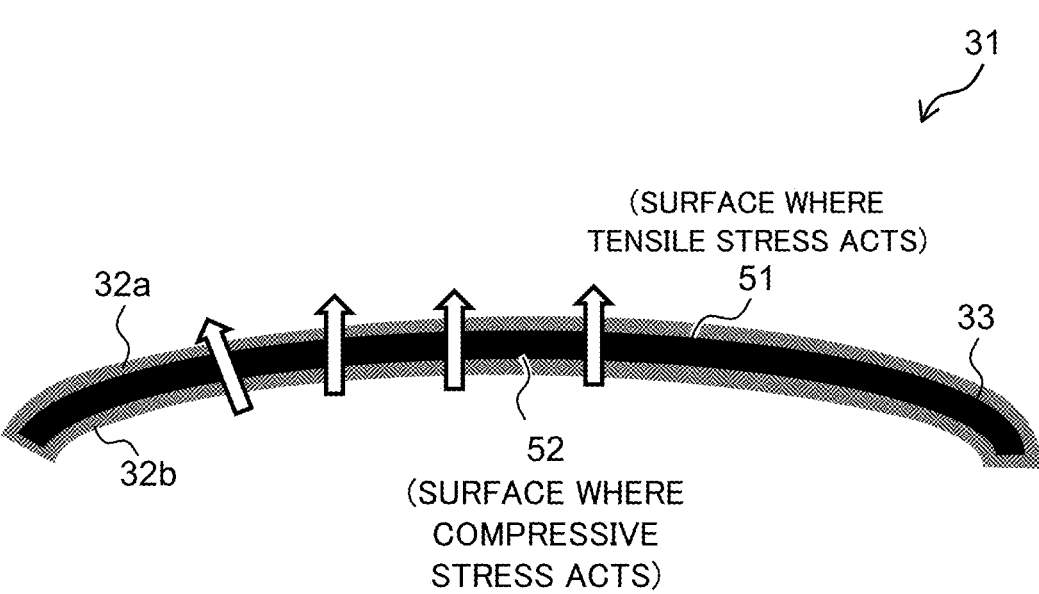
FIG. 7 shows a configuration of a pressure sensor according to a third embodiment.

FIG. 7 shows a configuration of a pressure sensor 31 according to the third embodiment.

The pressure sensor 31 shown in FIG. 7 includes two different flexible printed circuits (32a and 32b) and one sheet-like pressure sensitive element 33. The pressure sensitive element 33 is equivalent to the pressure sensitive element 13 of the first embodiment, and is enclosed in an inner space of the pressure sensor 31, the inner space being formed by an upper surface of the flexible printed circuit 32a on the upper side and a lower surface of the flexible printed circuit 32b on the lower side, in a position where a upper surface 51 faces a lower surface of the flexible printed circuit 32a on the upper side and a lower surface 52 faces an upper surface of the flexible printed circuit 32b on the lower side.

The upper surface 51 of the pressure sensitive element 33 is bonded and fixed to the lower surface of the flexible printed circuit 32a on the upper side. Therefore, tensile stress acts on the upper surface 51 of the pressure sensitive element 33 in relation to the flexible printed circuit 32a on the upper side.

In addition, the lower surface 52 of the pressure sensitive element 33 is bonded and fixed to the upper surface of the flexible printed circuit 32b on the lower side. Therefore, compressive stress acts on the lower surface 52 of the pressure sensitive element 33 in relation to the flexible printed circuit 32b on the lower side.

Figure 8A:
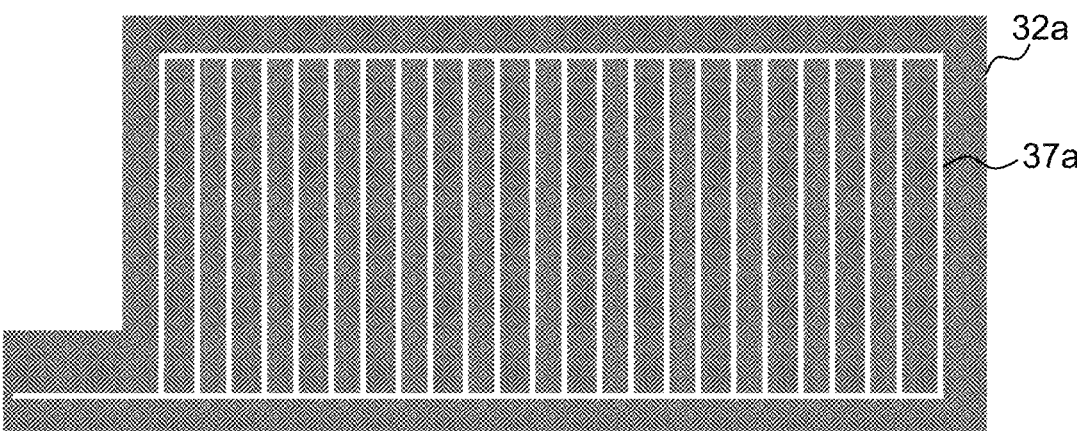
FIG. 8A shows a configuration of an upper substrate of the pressure sensor according to the third embodiment.
Figure 8B:
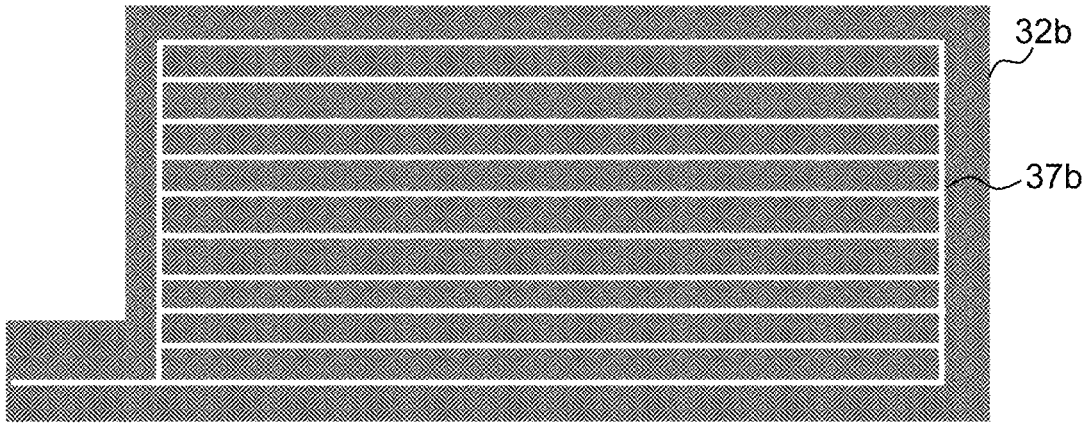
FIG. 8B shows a configuration of a lower substrate of the pressure sensor according to the third embodiment.

Each of the flexible printed circuit 32a on the upper side shown in FIG. 8A and the flexible printed circuit 32b on the lower side shown in FIG. 8B is provided with only a different positive or negative electrode, unlike the flexible printed circuits (12a, 12b, and 12c) of the first embodiment and the second embodiment in which the positive and negative electrodes 17 are provided. A positive electrode is provided on the flexible printed circuit 32a on the upper side shown in FIG. 8A, and a negative electrode is provided on the flexible printed circuit 32b on the lower side shown in FIG. 8B. Therefore, in the pressure sensor 31, a current flows from the flexible printed circuit 32b on the lower side to the flexible printed circuit 32a on the upper side via the pressure sensitive element 33. Accordingly, the tensile stress acting on the upper surface 51 of the pressure sensitive element 33 in relation to the flexible printed circuit 32a on the upper side and the compressive stress acting on the lower surface 52 of the pressure sensitive element 33 in relation to the flexible printed circuit 32b on the lower side are cancelled, so that the pressure sensor 31 can remove the influence of these stresses. As a result, the pressure sensor 31 can emit a sensor signal that accurately reflects only the pressure to be truly detected.

It should be noted that, as shown in FIG. 8A and FIG. 8B, the orientation of the stripes of the electrode of the flexible printed circuit 32a on the upper side arranged approximately in a stripe shape and the orientation of the stripes of the electrode of the flexible printed circuit 32b on the lower side arranged approximately in a stripe shape may be different from each other. By forming the electrodes of the flexible printed circuits (32a and 32b) approximately in a stripe shape, the pressure sensor 31 can easily be bent in the direction of the stripes. In addition, in a case where the orientation of the stripes of the electrode of the flexible printed circuit 32a on the upper side and the orientation of the stripes of the electrode of the flexible printed circuit 32b on the lower side are different from each other, the amount of change in resistance value when the pressure for each location of the pressure sensor 31 is applied can be made uniform.

Figure 9A:
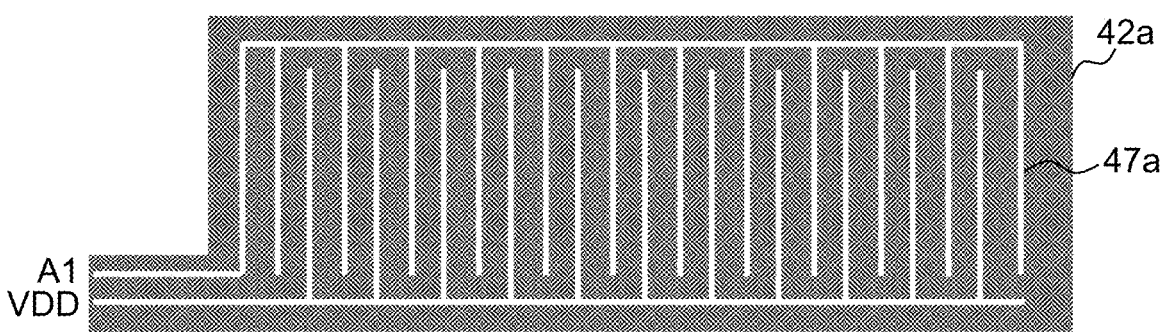
FIG. 9A shows a modified example of the configuration of the upper substrate of the pressure sensor according to the third embodiment.
Figure 9B:
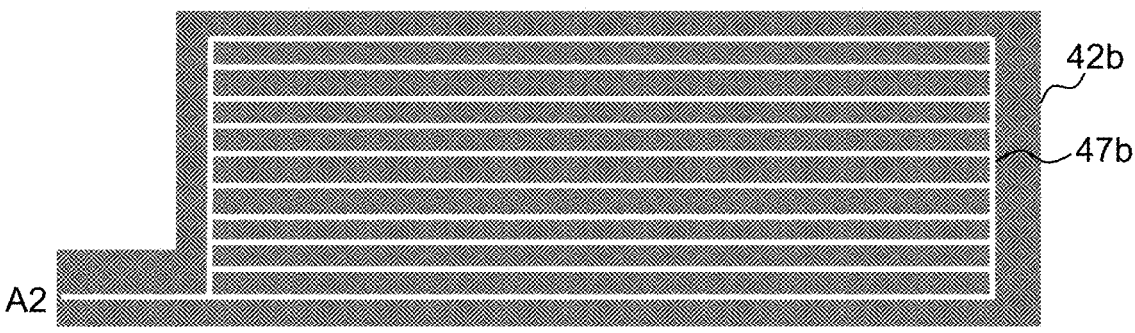
FIG. 9B shows a modified example of the configuration of the lower substrate of the pressure sensor according to the third embodiment.
Figure 10:
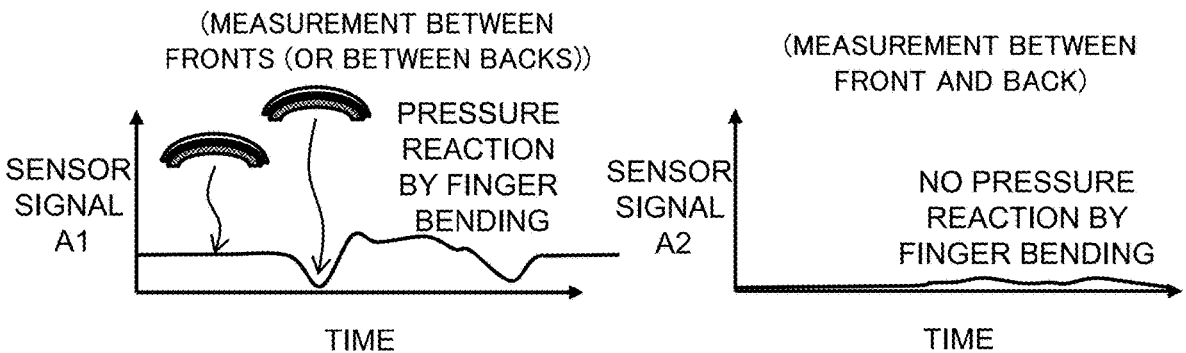
FIG. 10 shows the relation between an electrode terminal to be used and a sensor signal to be acquired in the pressure sensor using the flexible printed circuit shown in FIGS. 9A and 9B.

In addition, the flexible printed circuit used for the above pressure sensor 31 may be provided with electrodes the numbers of which are different form each other, as in a flexible printed circuit 42a shown in FIG. 9A and a flexible printed circuit 42b shown in FIG. 9B. The flexible printed circuit 42a on the upper side shown in FIG. 9A is provided with two electrodes formed approximately in a comb-like shape. In addition, the flexible printed circuit 42b on the lower side shown in FIG. 9B is provided with one electrode formed approximately in a stripe shape. In such a case, the pressure sensor 31 can properly separate the pressing pressure on the finger from the other miscellaneous pressures by devising the wire connection as shown in FIG. 10. As a result, the pressure sensor 31 can remove the influence of the unnecessary pressure detected by the pressure sensitive sensor in the prior art when the wearer of the wearable sensor 1c performs a finger-bending action.

It should be noted that the present invention is not limited to the above embodiments, and can be carried out using any constitutional elements without departing from the gist thereof.

The above embodiments and modified examples are only examples, and the present invention is not limited to these contents as long as the features of the invention are not impaired. In addition, although various embodiments and modified examples have been described above, the present invention is not limited to these contents. Other aspects considered within the scope of the technical idea of the invention are also included within the scope of the invention.

What is claimed is:

1. A glove wearable sensor comprising:

a glove; and a film-like pressure sensor, wherein the pressure sensor is incorporated into a fingertip of the glove, wherein three coordinate axis directions in a three-dimensional orthogonal coordinate system include a vertical direction of sensor layers of the pressure sensor, a longitudinal direction of the pressure sensor along its longest length, and in the same plane as the longitudinal direction, a width direction of the pressure sensor along its shortest length, wherein only a pressure applied to a fingertip of a wearer after wearing the wearable sensor is detected, wherein the pressure sensor includes a flexible printed circuit, a sheet-like pressure sensitive element, and a protective film that are laminated in the vertical direction, and wherein a first double-sided non-adhesive film is interposed between an upper surface of the flexible printed circuit and a lower surface of the pressure sensitive element and a second double-sided non-adhesive film is interposed between an upper surface of the pressure sensitive element and a lower surface of the protective film.

2. The glove wearable sensor according to claim 1, wherein side surfaces of the pressure sensor in the longitudinal direction are protected by a plurality of divided portions of the protective film.

3. The glove wearable sensor according to claim 1, wherein the pressure sensitive element is sandwiched between two of the flexible printed circuits, and each of the two flexible printed circuits is provided with a different positive or negative electrode.

4. The glove wearable sensor according to claim 3, wherein each of the two flexible printed circuits is provided with an electrode formed approximately in a stripe shape, and an orientation of stripes of the electrode of the flexible printed circuit on an upper side and an orientation of stripes of the electrode of the flexible printed circuit on a lower side are different from each other.

5. The glove wearable sensor according to claim 3, wherein the flexible printed circuit on the upper side is provided with two or more electrodes formed approximately in a comb-like shape, and the flexible printed circuit on the lower side is provided with one electrode formed approximately in a stripe shape.

6. The glove wearable sensor according to claim 1, wherein side surfaces of the pressure sensor in the longitudinal direction are protected by an adhesive film that is divided into a plurality of portions.

7. A glove wearable sensor comprising:

a glove; and a film-like pressure sensor, wherein the pressure sensor is incorporated into a fingertip of the glove, wherein three coordinate axis directions in a three-dimensional orthogonal coordinate system include a vertical direction of sensor layers of the pressure sensor, a longitudinal direction of the pressure sensor along its longest length, and in the same plane as the longitudinal direction, a width direction of the pressure sensor along its shortest length, wherein only a pressure applied to a fingertip of a wearer after wearing the wearable sensor is detected, wherein the pressure sensor includes a flexible printed circuit, pressure sensitive elements, and a protective film that are laminated in the vertical direction, wherein the pressure sensitive elements are arranged approximately at equal intervals in an inner space of the pressure sensor, the inner space being formed by an upper surface of the flexible printed circuit and a lower surface of the protective film, such that a width direction of each of the pressure sensitive elements is the longitudinal direction of the pressure sensor, and wherein the flexible printed circuit has a wiring pattern formed such that a position where each of the pressure sensitive elements is arranged overlaps a position of an area covering a single line of a positive electrode and single line of a paired negative electrode.

8. The glove wearable sensor according to claim 7, wherein the flexible printed circuit is formed such that positions overlapping gaps provided between the pressure sensitive elements are easily bent.

9. A glove wearable sensor comprising:

a glove; and a film-like pressure sensor, wherein the pressure sensor is incorporated into a fingertip of the glove, wherein three coordinate axis directions in a three-dimensional orthogonal coordinate system include a vertical direction of sensor layers of the pressure sensor, a longitudinal direction of the pressure sensor along its longest length, and in the same plane as the longitudinal direction, a width direction of the pressure sensor along its shortest length, wherein only a pressure applied to a fingertip of a wearer after wearing the wearable sensor is detected, wherein the pressure sensor includes a flexible printed circuit, pressure sensitive elements, and a protective film that are laminated in the vertical direction, wherein the pressure sensitive elements are arranged approximately at equal intervals in an inner space of the pressure sensor, the inner space being formed by an upper surface of the flexible printed circuit and a lower surface of the protective film, such that a width direction of each of the pressure sensitive elements is the longitudinal direction of the pressure sensor, wherein the pressure sensitive elements are sandwiched between two of the flexible printed circuits, and each of the two flexible printed circuits is provided with a different positive or negative electrode.

10. The glove wearable sensor according to claim 9, wherein each of the two flexible printed circuits is provided with an electrode formed approximately in a stripe shape, and an orientation of stripes of the electrode of the flexible printed circuit on an upper side and an orientation of stripes of the electrode of the flexible printed circuit on a lower side are different from each other.

11. The glove wearable sensor according to claim 9, wherein the flexible printed circuit on the upper side is provided with two or more electrodes formed approximately in a comb-like shape, and the flexible printed circuit on the lower side is provided with one electrode formed approximately in a stripe shape.

* * * * *